United States Patent Office 3,293,309
Patented Dec. 20, 1966

3,293,309
PREPARATION OF o-BROMOPHENOLS
John W. Zemba, Midland, Mich., assignor to The Dow Chemical Company, Midland, Mich., a corporation of Delaware
No Drawing. Filed July 25, 1962, Ser. No. 212,487
14 Claims. (Cl. 260—623)

This invention relates to the preparation of phenols which are monobrominated in the ortho position. It relates particularly to the production of o-bromophenol itself.

Orthobromophenols in general which have an unsubstituted para position and o-bromophenol in particular are relatively rare chemicals, largely because no economically practical methods for their manufacture has so far been found. Known methods for making o-bromophenol, for example, include the diazotization of o-bromoaniline, the decarboxylation of 3-bromosalicyclic acid, and the diazotization of o-aminophenol. Monobromination of phenol at ordinary temperatures yields p-bromophenol almost exclusively, very little of the ortho isomer being formed. It has long been known that brominations carried out at higher temperatures yield more of the ortho isomer but even so, maximum yields of o-bromophenol thereby obtained are only of the order of 20–25%. It is also known, as shown by Dietzler, U.S. 2,716,139, that p-bromophenol is unstable when heated for long periods of time, breaking down when so heated to form various products, including phenol, o-bromophenol, 2,4-dibromophenol, and tarry substances, the individual compounds being found in the heated p-bromophenol only in small amounts, however.

It has now been found that o-bromophenols such as o-bromophenol, 6-bromo-m-cresol, and 6-bromo-o-cresol can be produced in good yields by heating a corresponding parabrominated phenol at about 100° C. to about 200° C. in the presence of an acidic catalyst for a period of time sufficient to establish substantially equilibrium conditions. The o-bromophenol thereby produced can be separated, preferably by distillation, from the reaction mixture. Nearly quantitative yields of the desired orthobromo isomer can be obtained by running the process as a bromination wherein the ortho isomer is separated from the reaction mixture after a heating step, a quantity of the unbrominated phenol approximately equivalent to the amount of ortho isomer separated is added to the separation residue, and the bromination and heating processes are repeated, the acidic catalyst remaining in the mixture throughout the cycle.

The acidic catalyst can be hydrogen bromide as formed in a bromination reaction or it can be a substance of the type which is an effective catalyst in the Friedel-Crafts reaction such as aluminum chloride, aluminum bromide, ferric bromide, zinc chloride, phosphoric acid, sulfuric acid, arylsulfonic acids, boron trifluoride or an acid-activated clay such as that sold under the trade name Retrol. Best results are obtained with a combination of hydrogen bromide and an essentially non-volatile catalyst such as described above. Phosphoric acid has been found to be a particularly effective non-volatile catalyst. The amount of catalyst is not critical so long as it is sufficient to be catalytically effective. As little as 0.01% or as much as 10% by weight of the reaction mixture may be employed. Ordinarily, from 0.1% to 2% is suitable.

The isomerization process is operable within the approximate range 100–200° C. and the reflux temperature of the reaction mixture is often a convenient level of operation. A preferred temperature range is about 150–180° C.

Where the reaction mixture is the result of a phenol bromination step, that bromination may be carried out at any temperature where phenol is liquid, that is, at about 40–200° C. Preferably this step is carried out at or near the reflux temperature of phenol, for example at 150–180° C.

The time required for essentially equilibrium conditions to be reached in the isomerization varies according to the particular catalyst or catalysts used and the reaction temperature. Ordinarily, substantially complete reaction is obtained in about 1–20 hours. The process is preferably run starting with a high temperature bromination at about 150–180° C. as previously mentioned, wherein the mixture is brominated until essentially all of the starting phenol is consumed. The relatively high proportion of orthobromo isomer thereby obtained is then more easily increased to about the equilibrium value by the isomerization process. It has been determined that the composition of the equilibrium mixture of brominated phenol is approximately 41 mole percent of o-bromophenol, 35 mole percent of p-bromophenol, and 24 mole percent of 2,4-dibromophenol.

The point to which the bromination of phenol is carried depends laregly on the degree of purity desired in the o-bromophenol product. Phenol and o-bromophenol form a constant boiling mixture not separable by fractional distillation. Therefore, for a good yield of essentially phenol-free o-bromophenol, the bromination is continued until essentially no unreacted phenol remains. In a high temperature bromination such as described, this requires about 1.2 moles of bromine per mole of phenol and preferably about 1.1–1.3 moles of bromine is used. When bromine and phenol are reacted in equivalent proportions, a small but appreciable amount of unbrominated phenol remains in the reaction product and its proportion is increased somewhat during the isomerization step. For some purposes, o-bromophenol which contains a little phenol is satisfactory and the process may therefore be run in this manner. Larger proportions of bromine may also be employed in the process with satisfactory results, for example, up to about 1.5 moles of bromine per mole of phenol.

Examples 1 and 2 show respectively the composition obtained by brominating phenol at high temperature, (1) in the essential absence of HBr and (2) where the reaction mixture is saturated with HBr.

*Example 1*

A reaction flask equipped with a gas inlet tube and a reflux condenser was charged with 4 g. moles of phenol. The phenol was heated under atmospheric pressure to reflux temperature and gaseous bromine carried by a stream of nitrogen was admitted over the surface of the boiling liquid. The hydrogen bromide evolved passed through the reflux condenser and was absorbed in a water scrubber while the phenol and bromophenol vapors were condensed and returned to the flask. After admission of 4.4 g. moles of bromine in the above fashion in 17 hours, most of the phenol had been brominated. The composition of the reaction mixture at progressive stages of the process is shown in the following table:

| Mole ratio, Bromine/phenol | Mole Percent Composition | | | |
|---|---|---|---|---|
| | Phenol | o-Bromophenol | p-Bromophenol | 2,4-dibromophenol |
| 0.29 | 70 | 3 | 27 | 0 |
| 0.61 | 39 | 7 | 54 | 0 |
| 0.90 | 13 | 22 | 62 | 3 |
| 1.10 | 3 | 27 | 57 | 13 |

Example 2

Phenol was reacted with a molar equivalent of bromine at 170–175° C., the bromine being introduced into the liquid phenol as a gas diluted with nitrogen. The molar composition of the resulting reaction mixture was 9% phenol, 32% o-bromophenol, 47% p-bromophenol, and 13% 2,4-dibromophenol. Example 3 shows the results obtained by brominating a phenol p-bromophenol mixture at high temperature in the presence of both HBr and phosphoric acid.

Example 3

A mixture of 2.75 g. moles of phenol and 4.0 g. moles of p-bromophenol containing 0.1% by weight of lead phosphate was reacted with 3.0 g. moles of bromine at 170–175° C. the bromine being introduced into the liquid reaction mixture as a gas diluted with nitrogen over a period of 12 hours. The lead phosphate reacted with the acid formed in the first stages of the reaction and dissolved. The molar composition of the crude reaction product was 2% phenol, 44% o-bromophenol, 47% p-bromophenol, and 7% 2,4-dibromophenol.

The effect of acid catalysis on the rate of isomerization of p-bromophenol and the progress of the isomerization are shown in Examples 4 and 5 respectively.

Example 4

In run A, p-bromophenol was heated without an additive in a glass flask at 170–175° C. for 24 hours. In run B, p-bromophenol containing 1.0% by weight of aluminum bromide was similarly heated but at 150–155° C. and for only four hours. In run C, p-bromophenol kept saturated with HBr by bubbling the anhydrous gas through the liquid was heated similarly at 150–155° C., also for 4 hours. The compositions of the reaction mixture obtained are listed below. Yields are based on the conversion of para.

| Run | Mole Percent Composition Obtained | | | | Yield Percent | | |
|---|---|---|---|---|---|---|---|
| | Phenol | Ortho | Para | Di | Phenol | Ortho | Di |
| A | 11.9 | 28.8 | 47.5 | 11.9 | 21.7 | 56.5 | 21.7 |
| B | 12.1 | 34.8 | 40.9 | 12.1 | 20.5 | 59.0 | 20.5 |
| C | 11.4 | 33.2 | 44.0 | 11.4 | 20.3 | 59.3 | 20.3 |

The acceleration in conversion of p-bromophenol caused by the presence of an acidic substance is clearly evident.

The progressive change of composition of the reaction mixture in run C over a period of time is shown in Example 5.

Example 5

| Heating Time, Hours | Percent Conversion of Para | Percent Yield | | |
|---|---|---|---|---|
| | | Phenol | Ortho | Di |
| 1 | 24.9 | 29.2 | 41.6 | 29.2 |
| 2 | 43.5 | 22.3 | 55.4 | 22.3 |
| 4 | 56.0 | 20.3 | 59.4 | 20.3 |
| 7 | 62.0 | 19.3 | 61.4 | 19.3 |
| 12 | 66.0 | 18.9 | 62.2 | 18.9 |

It is seen from the above figures that p-bromophenol is converted at a gradually diminishing rate, the conversion approaching a maximum value of about 65–70%. The results obtained suggest that the reaction may proceed by way of two stages, the first being the disproportionation of p-bromophenol to phenol and dibromophenol and the second being the interaction of phenol and dibromophenol to form a mixture of a o-bromophenol and p-bromophenol. This possible mechanism is, however, merely suggested and is not intended as limiting the scope of the present invention.

Examples 6 and 7 are similar to Examples 4 and 5 except that the starting material was a mixture of phenol and 2,4-dibromophenol.

Example 6

Three runs were made wherein mixtures of phenol and 2,4-dibromophenol were heated at 170–175° C. for varying periods of time, with and without the addition of acid catalysts. In run D, no catalyst was added to the mixture; in run E, the mixture contained 1% by weight of aluminum bromide; in run F, 1% by weight of phosphoric acid was added and anhydrous hydrogen bromide was bubbled through the reaction mixture throughout the heating period.

| Run | Molar Composition | | | | Percent Dibromo Converted | Percent Yield | |
|---|---|---|---|---|---|---|---|
| | Phenol | Ortho | Para | Di | | Ortho | Para |
| D-start | 0.53 | | | 0.20 | 10.0 | 40.0 | 60.0 |
| 24 hrs | 0.51 | 0.02 | 0.03 | 0.18 | | | |
| E-start | 4.29 | | | 4.29 | 29.6 | 59.9 | 41.0 |
| 4 hrs | 3.02 | 1.55 | 0.98 | 3.02 | | | |
| F-start | 4.00 | | | 4.00 | 35.5 | 50.7 | 49.3 |
| 2 hrs | 2.58 | 1.44 | 1.40 | 2.58 | | | |

The marked effect of acid catalysis and the superior activity of combined catalysts are clearly shown by these results. The change in composition over a period of time in run F is shown in Example 7.

Example 7

| Time, Hrs. | Molar Composition | | | | Percent Dibromo Converted | Percent Yield | |
|---|---|---|---|---|---|---|---|
| | Phenol | Ortho | Para | Di | | Ortho | Para |
| 0 | 4.00 | | | 4.00 | 0 | | |
| 1 | 2.95 | 1.04 | 1.04 | 2.96 | 26.0 | 50.0 | 50.0 |
| 2 | 2.58 | 1.44 | 1.40 | 2.58 | 35.5 | 50.7 | 49.3 |
| 7 | 1.76 | 2.56 | 1.92 | 1.76 | 56.0 | 57.1 | 42.9 |
| 12 | 1.55 | 2.87 | 2.04 | 1.55 | 61.5 | 58.5 | 41.5 |

A gradual increase in the yield of o-bromophenol toward a maximum of about 60% based on a conversion of dibromophenol approaching 60–65% is shown by these results.

Examples 8 and 9 illustrate the application of the invention in the bromination of m-cresol and o-cresol and show in each case the increased ratio of orthobromo to ponabromo compound thereby obtained.

Example 8 m-Cresol was brominated at 55–65° C. with an equivalent of bromine added as a gas carried by a stream of nitrogen. The reaction mixture was then heated to 145–155° C. for six hours in the presence of residual hydrogen bromide to determine the extent of rearrangement. The mixture was then heated an additional six hours at the same temperature after addition of 1% by weight of phosphoric acid and with a stream of hydrogen bromide bubbling through the liquid. The mole percent compositions obtained (1) after the bromination, (2) after the first period of heating and (3) after the addition of phosphoric acid and the second period of heating while saturated with hydrogen bromide are listed below.

| | (1) | (2) | (3) |
|---|---|---|---|
| m-Cresol | 5.7 | 6.4 | 16.5 |
| 6-bromo-m-cresol | 32.8 | 39.5 | 41.6 |
| 4-bromo-m-cresol | 51.5 | 42.3 | 23.1 |
| 4,6-dibromo-m-cresol | 10.0 | 11.5 | 16.9 |
| Others | | | 1.9 |

The relatively high proportion of dibromocresol resulted from the low temperature of bromination. As is evident from the above figures, the first heating period raised the proportion of 6-bromo-m-cresol to 4-bromo-m-cresol from 3:5 to about 1:1 while the further heating in the presence of the combined catalysts raised this proportion to nearly 2:1.

*Example 9*

The procedure of Example 8 was repeated using o-cresol in place of m-cresol. The results obtained are listed below, the figures 1, 2, and 3 having the same meaning as in the preceding example.

|  | (1) | (2) | (3) |
|---|---|---|---|
| o-Cresol | 14.0 | 14.0 | 14.6 |
| 6-bromo-o-cresol | 6.0 | 19.0 | 30.9 |
| 4-bromo-o-cresol | 57.0 | 43.0 | 29.5 |
| 4,6-dibromo-o-cresol | 22.0 | 24.0 | 24.2 |
| Others |  |  | 0.4 |

The proportion of 6-bromo-o-cresol is seen to be increased in a manner similar to that shown in Example 8.

Example 10 illustrates a preferred embodiment of the present invention as a process for the production of o-bromophenol with recycle of the other products of reaction and the catalyst.

*Example 10*

A mixture of 1.0 mole of phenol and about 1% by weight of phosphoric acid is reacted with about 1.25 moles of bromine at about 170° C. in a suitable kettle equipped with a stirrer and a reflux condenser. The hydrogen bromide evolved during the course of the reaction is freed of phenolic vapors by the cooled reflux condenser and passed to storage for reuse or sale. After addition of all the bromine, hydrogen bromide is passed through the crude reaction mixture at about 170° C. for a period of about 4–8 hours, thereby producing an equilibrium composition containing about 41 mole percent of o-bromophenol, 35 mole percent of p-bromophenol, and 24 mole percent of 2,4-dibromophenol. The product is then fractionally distilled under reduced pressure to remove all or most of the o-bromophenol. The distillation residue consisting essentially of p-bromophenol, 2,4-dibromophenol, and the phosphoric acid catalyst is then returned to the bromination process. To this mixture there is added fresh phenol, preferably in an amount about equivalent to the o-bromophenol separated, and the bromination procedure is repeated but using this time an amount of bromine substantially equivalent to the fresh phenol added, since under these conditions the phenol is thereby essentially all brominated. The heating period and the distillation are then repeated and the cycle of operation continues. By following the preferred procedure described, the o-bromophenol thereby produced is essentially equivalent to the fresh phenol added to the process.

Results similar to those shown in the above mixed acid catalyst examples are obtained when the phosphoric acid or aluminum bromide used therein is replaced with a like quantity of other non-volatile Friedel-Crafts type catalysts such as sulfuric acid, ferric bromide, zinc chloride, an aryl sulfonic acid, or an acid-activated clay.

I claim:

1. A process for making an o-bromophenol selected from the group consisting of o-bromophenol, 6-bromo-o-cresol, and 6-bromo-m-cresol, which process comprises contacting a corresponding p-bromophenol with an effective amount of at least one acidic catalyst selected from the group consisting of hydrogen bromide and a Friedel-Crafts catalyst at about 100° to about 200° C. for a period of time sufficient for a substantial degree of isomerization to take place, and separating an o-bromophenol from the reaction mixture thereby formed.

2. The process of claim 1 wherein the acidic catalyst comprises hydrogen bromide.

3. The process of claim 1 wherein the acidic catalyst comprises a Friedel-Crafts catalyst.

4. The process of claim 1 wherein the acidic catalyst comprises hydrogen bromide and an essentially non-volatile Friedel-Crafts catalyst.

5. The process of claim 1 wherein the product is o-bromophenol.

6. A process for making o-bromophenol which comprises contacting p-bromophenol with an effective amount of an acidic catalyst comprising hydrogen bromide and phosphoric acid at about 100–200° C. for a period of time sufficient for a substantial degree of isomerization to take place, and separating o-bromophenol from the reaction mixture thereby formed.

7. A process for making o-bromophenol which comprises the step of reacting by contacting about 1.0 to about 1.5 moles of bromine with one mole of phenol at 40–200° C., heating the reaction mixture thereby obtained at about 100° to about 200° C. in the presence of an effective amount of at least one acidic catalyst selected from the group consisting of hydrogen bromide and a Friedel-Crafts catalyst for a period of time sufficient for a substantial degree of isomerization to take place, separating at least a substantial portion of the o-bromophenol thereby formed from the reaction mixture, adding to the residual reaction mixture a quantity of phenol about equivalent to the o-bromophenol separated therefrom, and recycling the phenol-containing mixture to the bromination step.

8. The process of claim 7 herein the acidic catalyst comprises hydrogen bromide.

9. The process of claim 7 wherein the acidic catalyst comprises a Friedel-Crafts catalyst.

10. The process of claim 7 wherein the acidic catalyst comprises hydrogen bromide and an essentially non-volatile Friedel-Crafts catalyst.

11. The process of claim 10 wherein the Friedel-Crafts catalyst is phosphoric acid.

12. The process of claim 11 wherein the bromination step is carried out at about 150° to about 180° C.

13. A process for making 6-bromo-o-cresol which comprises contacting 4-bromo-o-cresol with an effective amount of at least one acidic catalyst selected from the group consisting of hydrogen bromide and a Friedel-Crafts catalyst at about 100° to about 200° C. for a period of time sufficient for a substantial degree of isomerization to take place, and separating 6-bromo-o-cresol from the reaction mixture thereby formed.

14. A process for making 6-bromo-m-cresol which comprises contacting 4-bromo-m-cresol with an effective amount of at least one acidic catalyst selected from the group consisting of hydrogen bromide and a Friedel-Crafts catalyst at about 100° to about 200° C. for a period of time sufficient for a substantial degree of isomerization to take place, and separating 6-bromo-m-cresol from the reaction mixture thereby formed.

References Cited by the Examiner

UNITED STATES PATENTS 2,716,139  8/1955  Dietzler _____ 260—623

FOREIGN PATENTS 12,942  4/1894  Great Britain.
of 1893

LEON ZITVER, *Primary Examiner.*

HAROLD G. MOORE, *Examiner.*

W. B. LONE, *Assistant Examiner.*